United States Patent
Soppera et al.

(10) Patent No.: US 8,791,794 B2
(45) Date of Patent: Jul. 29, 2014

(54) METHOD AND DEVICE FOR OBTAINING ITEM INFORMATION USING RFID TAGS

(75) Inventors: Andrea Soppera, Ipswich (GB); Trevor Burbridge, Ipswich (GB)

(73) Assignee: British Telecommunications PLC, London (GB)

( * ) Notice: Subject to any disclaimer, the term of this patent is extended or adjusted under 35 U.S.C. 154(b) by 1231 days.

(21) Appl. No.: 12/295,057

(22) PCT Filed: Mar. 12, 2007

(86) PCT No.: PCT/GB2007/000851
§ 371 (c)(1),
(2), (4) Date: Sep. 29, 2008

(87) PCT Pub. No.: WO2007/113464
PCT Pub. Date: Oct. 11, 2007

(65) Prior Publication Data
US 2009/0273451 A1    Nov. 5, 2009

(30) Foreign Application Priority Data

Mar. 31, 2006 (EP) .................................... 06251855

(51) Int. Cl.
*H04Q 5/22* (2006.01)
*G06K 19/07* (2006.01)
*G06K 17/00* (2006.01)

(52) U.S. Cl.
CPC .... *G06K 19/0723* (2013.01); *G06K 2017/0064* (2013.01); *G06K 2017/0045* (2013.01)
USPC ..... 340/10.4; 340/10.2; 340/10.3; 340/10.31; 340/10.32; 340/10.34; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
CPC ............ G06K 7/0008; G06K 19/0723; G06K 7/10039; G06Q 30/02; G06Q 10/87; G06Q 40/00; G06Q 20/1085; G06Q 20/341; G06Q 20/342; G07F 7/1008; G07F 17/145; G07F 19/20; G07C 1/14; G07C 1/10; G07B 15/04
USPC ......................... 340/10.1–10.6, 572.1–572.9; 235/375–385
See application file for complete search history.

(56) References Cited

U.S. PATENT DOCUMENTS 6,130,623 A * 10/2000 MacLellan et al. ............ 340/5.1
6,747,560 B2 * 6/2004 Stevens, III ................ 340/572.4
(Continued)

OTHER PUBLICATIONS

Extended European Search Report completed Sep. 6, 2006 in EP 06 25 1855 and Communication re same dated Sep. 20, 2006.
(Continued)

*Primary Examiner* — George Bugg
*Assistant Examiner* — Paul Obiniyi
(74) *Attorney, Agent, or Firm* — Nixon & Vanderhye PC

(57) ABSTRACT

Methods and devices for enabling a user to obtain item information relating to an item (10), the item having associated therewith an item identification means (12) and an RFID response means (14) arranged to provide a predetermined response on being subjected to a currently applicable trigger signal; the method comprising steps of: establishing from the item identification means (12) item identification information; using the item identification information to determine from an item information source (30) a currently applicable trigger signal for the RFID response means (14); subjecting the RFID response means (14) to the currently applicable trigger signal; receiving a predetermined response from the RFID response means (14); and using the predetermined response to obtain item information from the item information source (30); wherein the RFID response means (14) is arranged to generate a new currently applicable trigger signal and a new predetermined response associated therewith following subjecting of the RFID response means (14) to the currently applicable trigger signal.

24 Claims, 4 Drawing Sheets

(56) References Cited

U.S. PATENT DOCUMENTS

| | | | | |
|---|---|---|---|---|
| 6,784,787 | B1* | 8/2004 | Atkins et al. | 340/10.4 |
| 6,994,262 | B1* | 2/2006 | Warther | 235/492 |
| 7,118,036 | B1* | 10/2006 | Couch et al. | 235/385 |
| 7,176,784 | B2* | 2/2007 | Gilbert et al. | 340/10.34 |
| 7,204,652 | B2* | 4/2007 | Warther | 400/76 |
| 7,225,993 | B2* | 6/2007 | Warther | 235/492 |
| 7,275,690 | B1* | 10/2007 | White | 235/385 |
| 7,284,003 | B2* | 10/2007 | Honda | 1/1 |
| 7,284,704 | B2* | 10/2007 | Lubow | 235/462.01 |
| 7,382,259 | B2* | 6/2008 | Yun | 340/572.1 |
| 7,460,018 | B2* | 12/2008 | Kubo | 340/572.7 |
| 7,584,896 | B2* | 9/2009 | Warther | 235/492 |
| 7,591,422 | B2* | 9/2009 | Maitin | 235/383 |
| 7,606,557 | B2* | 10/2009 | Park et al. | 455/410 |
| 2004/0000997 | A1* | 1/2004 | Stevens, III | 340/572.1 |
| 2004/0073567 | A1* | 4/2004 | Pelon | 707/102 |
| 2005/0052279 | A1* | 3/2005 | Bridgelall | 340/10.1 |
| 2005/0104790 | A1* | 5/2005 | Duron | 343/745 |
| 2005/0156709 | A1* | 7/2005 | Gilbert et al. | 340/10.1 |
| 2005/0264421 | A1* | 12/2005 | Yun | 340/572.1 |
| 2006/0037502 | A1* | 2/2006 | Warther | 101/232 |
| 2006/0124757 | A1* | 6/2006 | Warther | 235/492 |
| 2006/0158308 | A1* | 7/2006 | McMullen et al. | 340/5.61 |
| 2006/0175402 | A1* | 8/2006 | Maitin | 235/383 |
| 2007/0011269 | A1* | 1/2007 | Jeon et al. | 709/217 |
| 2007/0017991 | A1* | 1/2007 | Lapstun et al. | 235/454 |
| 2007/0018002 | A1* | 1/2007 | Lapstun et al. | 235/487 |
| 2007/0141997 | A1* | 6/2007 | Wulff et al. | 455/78 |
| 2009/0009578 | A1* | 1/2009 | Nakanishi et al. | 347/171 |
| 2009/0072950 | A1* | 3/2009 | Gili et al. | 340/10.1 |

OTHER PUBLICATIONS

Weis, "Security and Privacy Aspect of Low-Cost Radio Frequency Identification Systems" Security In Pervasive Computing, [online] vol. 2802/2004, Jan. 27, 2004, pp. 201-212, XP002397694.
Henrici et al. "Hash-Based Enhancement of Location Privacy for Radio-Frequency Identification Devices Using Varying Identifiers" Pervasive Computing and Communications Workshops, 2004. Proceedings of the second IEEE Annual Conference on, Picataway, NJ. Mar. 14, 2004, pp. 149-153, XP010689745.
Berthold, "RFID:, Verbraucherangste and Verbraucherschutz" Wirthschaftsinformatik, No. 47, 2005, pp. 422-430, XP002397695.
Juels, "Strengthening EPC Tags Against Cloning" Sep. 2, 2005, XP002397696.
Staake, "Extending the EPC Network—The Potential of RFID in Anti-Counterfeiting" 2005 ACM Symposium on Applied Computing, Mar. 17, 2005, pp. 1607-1612, XP002397697.
Dirk et al, "Tackling Security and Privacy Issues in Radio Frequency Identification Devices" vol. LCNS3001, No. 588, 2004, pp. 219-224, XP019004321.
EPC Global: "Specification for RFID Air Interface. EPC Radio-Frequency Identity Protocols Class-I Generation-2 UHF FRID Protocol for communications at 860 MHz-960 MHz (Version 1.0.9)" Internet Citation, Jan. 31, 2005, XP007902164.
International Search Report for PCT/GB2007/000851, mailed May 21, 2007.
EPC Global: "Specification for RFID Air Interface. EPC Radio-Frequency Identity Protocols Class-1 Generation-2 UHF FRID Protocol for communications at 860 MHz-960 MHz (Version 1.0.9)" Internet Citation, Jan. 31, 2005, XP007902164.

* cited by examiner

METHOD AND DEVICE FOR OBTAINING ITEM INFORMATION USING RFID TAGS

This application is the U.S. national phase of International Application No. PCT/GB2007/000851 filed 12 Mar. 2007 which designated the U.S. and claims priority to GB 06251855.0. filed 31 Mar. 2006, the entire contents of each of which are hereby incorporated by reference.

TECHNICAL FIELD

The present invention relates to methods and systems for obtaining information about items, such as commercial products, from item information sources, such as product information databases. More specifically, the present invention relates to methods and systems for obtaining item information from an item information source by virtue of an item identification means, such as a visually readable label providing item identification information, and an RFID response means, such as an RFID tag, arranged to provide a predetermined response on being subjected to a currently applicable trigger signal.

BACKGROUND TO THE INVENTION AND PRIOR ART

RFID Tag Technology

Radio Frequency Identification (RFID) is an identification technology which relies on storing and retrieving data using devices called RFID tags. An RFID tag is in general a small object capable of functioning as a label, that can be attached to or incorporated into an item such as a commercial product, an animal, or a person.

Typically, an RFID tag consists of a small integrated circuit with a small storage capability and a radio antenna. Some tags, referred to as "active tags", have an internal power source which is generally used to power any processing circuitry and to generate outgoing signals. Other tags, referred to as "passive tags", do not have any internal power source. Passive tags generally obtain the energy required for responding to incoming signals and generating outgoing signals by collecting power from an electromagnetic field generated by a reader. Also, there exist tags known as "semi-active" (or sometimes "semi-passive") tags, which generally have a small power source in order to enable the tag's processing circuitry to be powered constantly. These tags therefore do not need to collect power from incoming signals before commencing any processing, allowing them generally to provide faster responses than passive tags, but active and semi-active tags are generally more expensive than passive tags.

An RFID tag generally holds identity information at least relating to an item with which it is associated. Current RFID tags typically offer a 96-bit identifier number that can be globally unique and addressable. Upon being queried by a reader, a tag generally responds with identity information which may point to a unique location in a database in which detailed information about the item may be stored. This may include product characteristics, data about the origin of the item, the identity of a manufacturer and other manufacturing details, pricing information, any appropriate expiry dates, etc.

RFID technology is thought to be a possible at least partial replacement for barcode technology, for which there exists a standard called the Universal Product Code (UPC). An RFID tag can provide an identification number, as can a barcode, but unlike barcodes, RFID tags can be read at a distance without a line-of-sight requirement, and without human intervention. Due to this and due to their small size, RFID tags can be placed in boxes with, or even inside consumer items, can be attached to clothes, and can be used in a wide variety of other applications.

RFID tag technologies have been in use for many years but major technology development has happened in the last few years in particular through the Auto-ID Center in collaboration with the MIT. An aim was to make RFID tag as simple as possible, with very small chips and a cost per tag of less than 0.1 US$. At this level, it is thought that RFID tags will realistically start to replace the barcodes presently used in relation to many consumer products, and economies of scale will then enable research into new applications. It is likely that the first tags of a sufficiently small size and having a low-enough cost for the above will be passive tags.

RFID Technology in the Detection and Prevention of Counterfeiting

One aspect in which RFID technology can immediately improve on barcode technology and other labelling systems based purely on visible markings is in the detection of dishonest labelling of products, thus helping to eliminate illegal markets based on fake goods such as counterfeit pharmaceutical products; pharmaceutical products and other perishable items that should have been taken off the market due to their age or "sell by" date; counterfeit fashion items such as clothing and jewellery; consumer electronics devices; and many other goods. While barcodes can essentially be simply photocopied, such that on being read or "scanned", the copy will provide the same data as the original, RFID tags cannot be so easily copied. They cannot generally even be "scanned" without the correct hardware, and various levels and types of encoding and authentication techniques can be used to protect data stored on or associated with them. This feature, coupled with the unique product codes that can be associated with products by means of RFID tags, and electronic "pedigrees" that can be provided by distributed databases, generally makes it harder and more expensive to convincingly label counterfeit goods as if they are genuine.

Counterfeit or out-of-date pharmaceutical products in particular represent a major risk to consumer safety. The World Health Organization (WHO) has estimated that around 7-8 percent of drugs worldwide are counterfeit, and reports from some countries suggest that as much as half of those countries' drugs are counterfeit. Medical authorities such as the Federal Drug Administration (FDA) in the United States, who are entrusted by governments with securing the safety of pharmaceutical preparations, are already making serious attempts to combat such problems, and it has already been suggested that RFID technology could make the copying of pharmaceuticals more difficult or unprofitable. An FDA report: "Combating Counterfeit Drugs" published on the internet in February 2004 strongly advocates the use of RFID in the pharmaceuticals industry, and suggests assigning a unique number to each drug package, pallet, or case to record information about all transactions involving the product, thus providing an electronic "pedigree" from the point of manufacture to the point of dispensing. By monitoring the pedigree and the information produced by an RFID tag the drug purchaser will be able to verify immediately the drug's authenticity. The information can provide full visibility of the supply chain.

The market for anti-counterfeiting solutions is of course not limited to the medical sectors. Around seven percent of world trade is thought to be in counterfeit goods. The music, software and luxury goods industries suffer enormous losses due to product cloning. Other markets are also heavily affected: up to 10 percent of all car parts, and up to 12 percent of toys commercialised in Europe are thought to be cloned.

The consequences for users include safety hazards, financial losses and bad product experience. For manufacturers, the situation is worse. Consequences include unjustified liability claims, negative impact on brand reputation, loss of revenue and negative impact on production and R&D.

There are several approaches to the use of identifiers as an anti-counterfeiting mechanism. We will briefly discuss two such approaches: using a unique identifier contained in an optical label with security properties (e.g. holograms); and using a unique identifier contained in an RFID tag.

The first approach depends on authenticating a specific product through a label or a hologram that cannot be easily copied. The prevention of counterfeiting of items such as currencies, passports, cheques, bank cards, credit cards, optical disks and the like can be addressed by associating the item with a label that has optical security properties, and encoding optical data decipherable only by optical means therein. The label can be manufactured with different optical properties. For example the label film can comprise multiple substrates, the different substrates having different colours and different optical properties. The image produced by the label can change depending on the viewing angle. The labels may be human-readable or readable only using a specific optical reader. A similar approach is to create labels that reflect light in different ways. A reflective label can be designed to reflect light radiation of predetermined wavelengths while substantially absorbing or transmitting light radiation of other predetermined wavelengths irradiating the same location on the label surface.

The following two patent publications relate to authentication of labels: U.S. Pat. No. 5,549,953 (Li) entitled "Optical Recording Media Having Optically-Variable Security Properties"; and U.S. Pat. No. 5,568,251 (Davies et al) entitled "Authenticating System".

In more recent approaches, which use RFID as the anti-counterfeiting technology, the main idea is to use a unique ID number to authenticate a product. The unique ID can be used to create an electronic pedigree system that allows for an end-to-end view of the product life cycle. A pharmaceutical bottle or package may contain an RFID tag that generates a unique identifier. The identifier can be a number in plain text or may be encrypted. A solution proposed by VeriSign is based on a tag that incorporates a 1024-bit encryption key and uses the same encryption technology proposed by smart card solutions.

Recently pharmaceutical industries have created electronic drug pedigree systems that detail a pharmaceutical product's movement through the supply chain. The concept is that an RFID tag or a simple barcode can be used to track a specific product from the manufacturing facility to a wholesaler and then to a retailer. The pedigree system makes use of a specific data file that maintains specific data about each single item. This system appears capable of reducing the risk of counterfeit medicines being introduced into the supply chain. While thieves and counterfeiters often exploit any weak links between the factory and the wholesaler and between the wholesaler and the retailer, RFID solutions integrated with such a pedigree model can make it possible to track and verify medicines and goods at low cost and without unnecessary disruption of current supply-chain processes.

A White Paper released in November 2005 on the "Anti-Counterfeiting of Medicines" by the European Federation of Pharmaceutical Industries and Associations (EFPIA) discusses the above issue from the points of view of different stakeholders in the pharmaceutical supply chain, and suggests the establishment of a "track-and-trace" information system in order to ensure the transparency of the supply chain and to combat offenders. In terms of technology the suggestion is to base this system on a pan-European Barcode standard. It is proposed that this standard should be able to work on the basis of the EPC (Electronic Product Code) as this is also compatible with other barcoding standards and with RFID technology. Furthermore, for such a scheme to be adopted, it is said that the impact on the cost per package should be very low—the White Paper suggests that it should not be higher than 1 eurocent per individual package. This last consideration implies that anti-counterfeiting applications should preferably aim to use functionality that can be provided by passive RFID tags.

As has been explained above, the cloning of RFID tags is generally harder and more expensive than the copying of barcodes and other labels according to systems based on visible markings, but it is not impossible. With appropriate devices such as readers and blank tags, cloning a standard tag (for example an EPC Generation 2 tag) can be done in a matter of minutes. The reader simply reads the original tag then writes the collected information to a blank tag.

The cloning operation is much harder when proprietary tags are deployed and when specific "trigger" signals are applied to read the tag information. In this case the aim of an attacker generally is to "reverse-engineer" the trigger-response algorithm by which the tag functions. In some cases "trigger" signals can be detected by a malicious user and can then be used to access information on a protected tag. One way to do this is to "eavesdrop", i.e. listen passively to signals from RFID tags and readers. Another way to do this is to perform active "interrogation" of the tag, using a series of different "trigger" signals. The success or failure of this approach may depend, amongst other factors, on the complexity of any encryption algorithm of the tag, and whether one-way functions are used or not.

A final class of attack is hardware reverse-engineering. In this case an attacker physically probes the tag using microscopes or radio emissions from the tag circuit.

Passive tags generally are more likely to be susceptible to the risks of cloning than active tags because in the absence of an internal power supply, their circuitry is generally less complex than that on active tags. This can result in them being easier to probe using microscopes, radio emissions or otherwise. It can also mean that any access control provided through a reading protocol is likely to be less secure than mechanisms such as "RSA" or elliptic curve cryptography used on active tags.

A paper entitled "Security and Privacy Aspects of Low-Cost Radio Frequency Identification Systems" by Stephen Weis et al (Security in Pervasive Computing, vol. 2802/2004, January 2004, pages 201-212) presents a brief description of RFID systems and their operation, and describes privacy and security risks and how they apply in relation to low-cost RFID devices. It describes a hash-lock scheme where a hash of the access key is used on a tag as a Meta-ID. A reader fetches this Meta-ID to look up the correct key which is passed to the tag, before the tag responds with the tag ID. This scheme is similar to those described above, and suffers from eavesdropping, reply attacks and tracking (since the Meta-ID is revealed to everyone).

A paper entitled "Hash-based Enhancement of Location Privacy for Radio-Frequency Identification Devices using Varying Identifiers" by Dirk Henrici et al (Proceedings of 2nd IEEE Annual Conference on Pervasive Computing . . . March 2004, pages 149-153) relates to RFID devices, and introduces a scheme relying on one-way hash-functions to enhance location privacy by changing traceable identifiers on every read. The ID is changed by a backend system, which communicates the change to the tag as the last communication to the tag. If this were to fail, the backend system and tag would be out of synchronisation.

A paper entitled "RFID: Verbraucherängste und Verbraucherschutz" by Oliver Berthold et al (Wirtschaftsinformatik no. 47, 2005, pages 422-430) discusses consumer fears and consumer protection in relation to RFID technology, explaining that it enables physical environments to become more interactive and supportive by tagging each item with a chip that wirelessly communicates with a service-enriched backend infrastructure. The paper presents the major fears associated with RFID introduction, discusses to what extent these fears are justified, and aims to derive some system requirements for giving users more control over an RFID-enabled IT infrastructure.

A paper entitled "Strengthening EPC Tags Against Cloning" by Ari Juels published online at http://portal.acm.org/citation.cfm?id=1080793.1080805 in September 2005 discusses techniques that may strengthen the resistance of EPC tags to elementary cloning attacks.

A paper entitled "Extending the EPC network: the potential of RFID in anti-counterfeiting" by Thorsten Staake et al (Procs. of 2005 ACM Symposium on Applied Computing, 17 Mar. 2005, pages 1607-1612) discusses how unique product identification numbers together with an infrastructure used to share RFID-related data over the Internet may provide a basis of efficient "Track & Trace" applications. The paper notes that the EPC Network can be used to provide pedigree information of products and makes plausibility checks possible, and proposes a solution for products requiring authentication mechanisms that go beyond track & trace.

SUMMARY OF THE INVENTION

According to the present invention there is provided a method for obtaining from an item information source item information relating to an item, said item having associated therewith an item identification means providing item identification information and an RFID response means arranged to provide a predetermined response on being subjected to a currently applicable trigger signal; said method comprising the steps of:
establishing from said item identification means item identification information;
using said item identification information to determine from said item information source a currently applicable trigger signal for said RFID response means;
subjecting said RFID response means to said currently applicable trigger signal;
receiving a predetermined response from said RFID response means; and
using said predetermined response to obtain item information from said item information source;
wherein the RFID response means is arranged to generate a new currently applicable trigger signal and a new predetermined response associated therewith following the subjecting of said RFID response means to said currently applicable trigger signal.

Also according to the present invention there is provided a device for enabling a user to obtain from an item information source item information relating to an item, said device comprising an item identification means for providing item identification information, and an RFID response means, wherein:
said item identification means comprises means from which can be established item identification information in dependence on which a currently applicable trigger signal for said RFID response means can be determined from said item information source; and
said RFID response means comprises means arranged to provide a predetermined response on being subjected to said currently applicable trigger signal, in dependence on which predetermined response item information can be obtained from said item information source;
said RFID response means further comprising means arranged to generate a new currently applicable trigger signal and a new predetermined response associated therewith following the subjecting of said RFID response means to said currently applicable trigger signal.

It will be understood that the RFID response means and the information source may thus act independently of each other in generating the same new currently applicable trigger signal and predetermined response following the subjecting of the RFID response means to the currently applicable trigger signal. It will also be understood that this differs from prior art such as Weis et al and Henrici et al above, in which the fundamental process is (a) read; (b) update tag. Embodiments of the present invention use a process in which the order of events can be summarised as (a) trigger; (b) read and update. This is made possible by the RFID response means essentially updating itself, rather than relying on receiving a further communication from the information source with updated information.

According to preferred embodiments, the RFID response means may independently compute or select a new read key simultaneously with, or at the same process stage as, a backend system, and a successful update to the item identification information may thus be guaranteed on both sides if the RFID response means is successfully read.

Embodiments of the present invention present methods and systems allowing a user to obtain assurance, indirectly at least, that an item such as a product is original, authentic, genuine, or otherwise "valid", and is not a "pirated" copy, for example. To be more precise, embodiments of the invention allow a user to verify that a label, a tag or another such marking or information means attached to or otherwise associated with the item and having an RFID component is original, authentic, genuine, or otherwise valid, and in particular that the RFID component itself is not a copy or clone, and by virtue of such verification, to obtain assurance relating to the origin and/or authenticity of the item itself.

According to preferred embodiments, the item identification information, which may be provided by means of a barcode printed on the item or on a label associated with the item, may effectively reference restricted-access password information available from the item information source which will be required, at a later stage in the authentication procedure, to access restricted-access unique identity information stored using an RFID component of the label, such as an RFID tag. The initial item identification information may however be visible to the naked eye, and may even be provided in a form understandable to any user, but if additional security or privacy is required at this stage, the item identification information may itself be hidden, encoded or encrypted. It may provided by the same or a different RFID component, for example.

Preferred embodiments may be used for checking product authenticity with reference to a secure database, provided by a trusted "third party" for example. This may be an on-line database openly accessible to the public or with restricted access. This may be achieved by password-protection or otherwise. Further flexibility in the level of security required may be provided by means of access controls to this item information source whenever it is to be consulted.

Once a user has determined the currently-applicable trigger signal for the RFID response means, this may be used to cause the RFID component to provide the predetermined response to that trigger signal. It is at this stage in the procedure that there is a danger of the trigger and response signals being detected or recorded by "eavesdroppers", but embodiments of the invention are arranged to make any successfully "eavesdropped" information immediately useless to the eavesdropper by virtue of the fact that the currently applicable trigger signal and the predetermined response will have been changed before the eavesdropper has the opportunity to subject the RFID response means to the eavesdropped trigger signal.

Preferred embodiments of the invention make use of a cryptographic scheme that uses one-way or hash functions to enable the generation of one-time access passwords and authentication codes in the tag in such a way that even an eavesdropper who has successfully eavesdropped a sequence of passwords and/or authentication codes over a period of time will find it very difficult or impossible to deduce further passwords and/or authentication codes that may still be applicable.

In addition to allowing end-users to verify the authenticity of items, such as those bought from the Internet, some embodiments enable the tracking of items along a supply-chain from a manufacturing facility to a wholesaler and then to a retailer, and can be used to support secure "pedigree" solutions such as those applicable in the case of pharmaceutical items, for example.

Embodiments of the invention allow for various other improvements over prior systems, including the following:

Firstly, it may be arranged that only a party having access to the trusted third-party database can access the information contained in the RFID tag. This approach prevents malicious users from creating a clone of a tag that produces "correct" information. Even if an attacker is able to eavesdrop the reading password and the unique identifier generated by the tag this information will not enable the attacker to clone the tag. The reading password and the unique identifier can only be used once, so can be regarded as being equivalent to a "one time password".

Secondly, a "one time password" provides a way to enable a secure pedigree model. Each time that a trusted third party is accessed and a product is verified, the information can be logged in a specific data file that maintains specific information about the specific product. The data file may represent a history of the product and may describe the different locations at which the product has been observed. A malicious user is prevented from generating false pedigrees by claiming that a product has been at a particular location because the trusted third party has control over the access passwords and unique identifiers generated by the tag. This requires that only authorised parties have access to the trusted third party database.

Thirdly, as the RFID tag may remain silent except when the item is being validly checked by a user with the correct reading password, tracking of the product by unwanted parties is hindered. This avoids certain privacy issues present with many existing RFID technologies. Privacy is a highly relevant topic in relation to specific drugs that address diseases such as HIV/AIDS, for example, and is of importance to users carrying specific drugs that can be linked to diseases such as this.

In summary, preferred embodiments of the present invention may enable or contribute towards any or all of the purposes outlined below, for example:

Verification that a product is original and/or that it has not been tampered with.

Secure distribution of product information across a supply chain allowing the creation of secure product pedigrees.

The combination of RFID, optical or other identifiers in conjunction with reader/user credentials to control the information released to the reader/user.

Increasing the security of a system against eavesdropping, surreptitious scanning and tag replication.

Compatibility of a system with trusted-readers (e.g. readers that use trusted software) such that a product may be verified using an offline process if necessary.

BRIEF DESCRIPTION OF THE DRAWINGS

Further features and advantages of the present invention will be apparent from the following description of embodiments thereof, presented by way of example only, and by reference to the accompanying drawings, wherein like reference numerals refer to like parts, and wherein.

DESCRIPTION OF THE EMBODIMENTS

Figure 1:
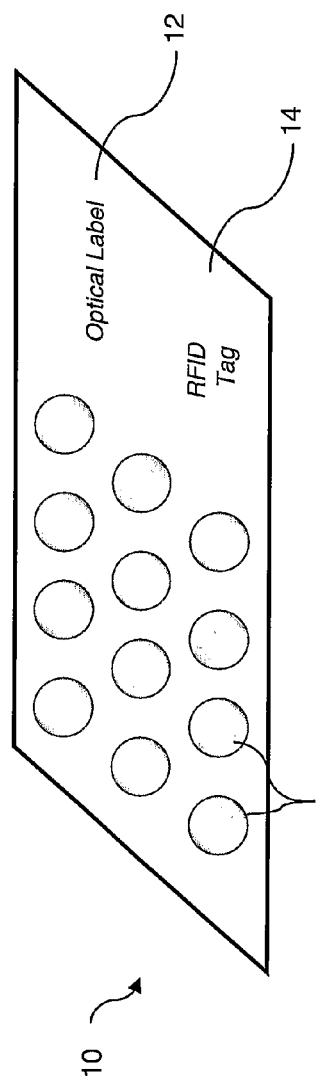
FIGS. 1(a) and 1(b) represent two ways in which a pharmaceutical product may be packaged and labelled.
Figure 1:
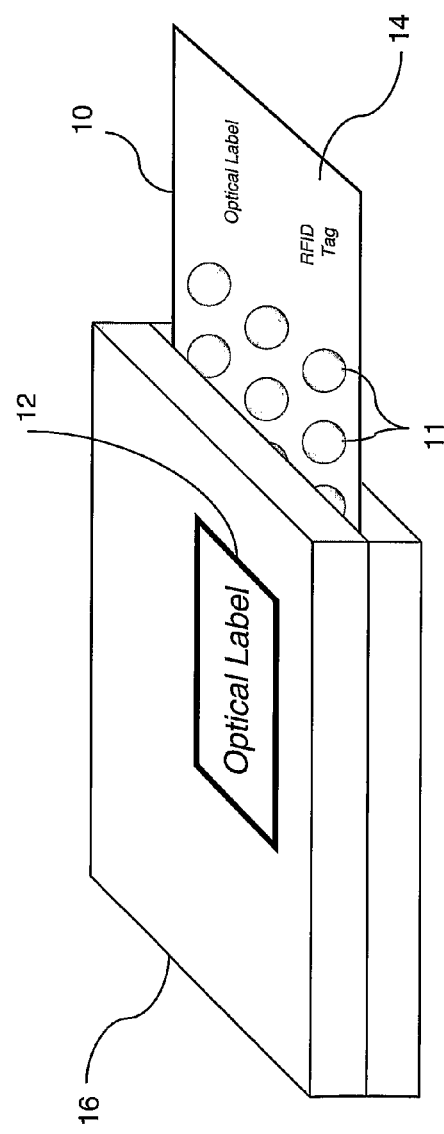

Embodiments of the present invention will now be described with reference to the accompanying drawings. FIGS. 1(a) and 1(b) represent two ways in which a pharmaceutical product may be packaged and labelled. In FIG. 1(a), a "blister-pack" 10 of pills 11 is shown having attached thereto an optical label 12, which may be a barcode, a 2-D code, a matrix-code, or a label with an item identification number printed thereon for example, and an RFID tag 14. In FIG. 1(b), a similar blister-pack is shown, but the optical label 12 is printed on an outer packet 16 associated with the blister-pack 10. The optical label 12 is also shown printed on the blister-pack 10, but FIG. 1(b) illustrates the point that while an optical label generally needs to be visible to be read, an RFID tag may be readable when located within a pack, or even within an object itself. It will also be noted that neither the optical label nor the RFID tag need to be physically attached to the item in question. Either may be associated in some other manner, as indicated by FIG. 1(b).

Figure 2:
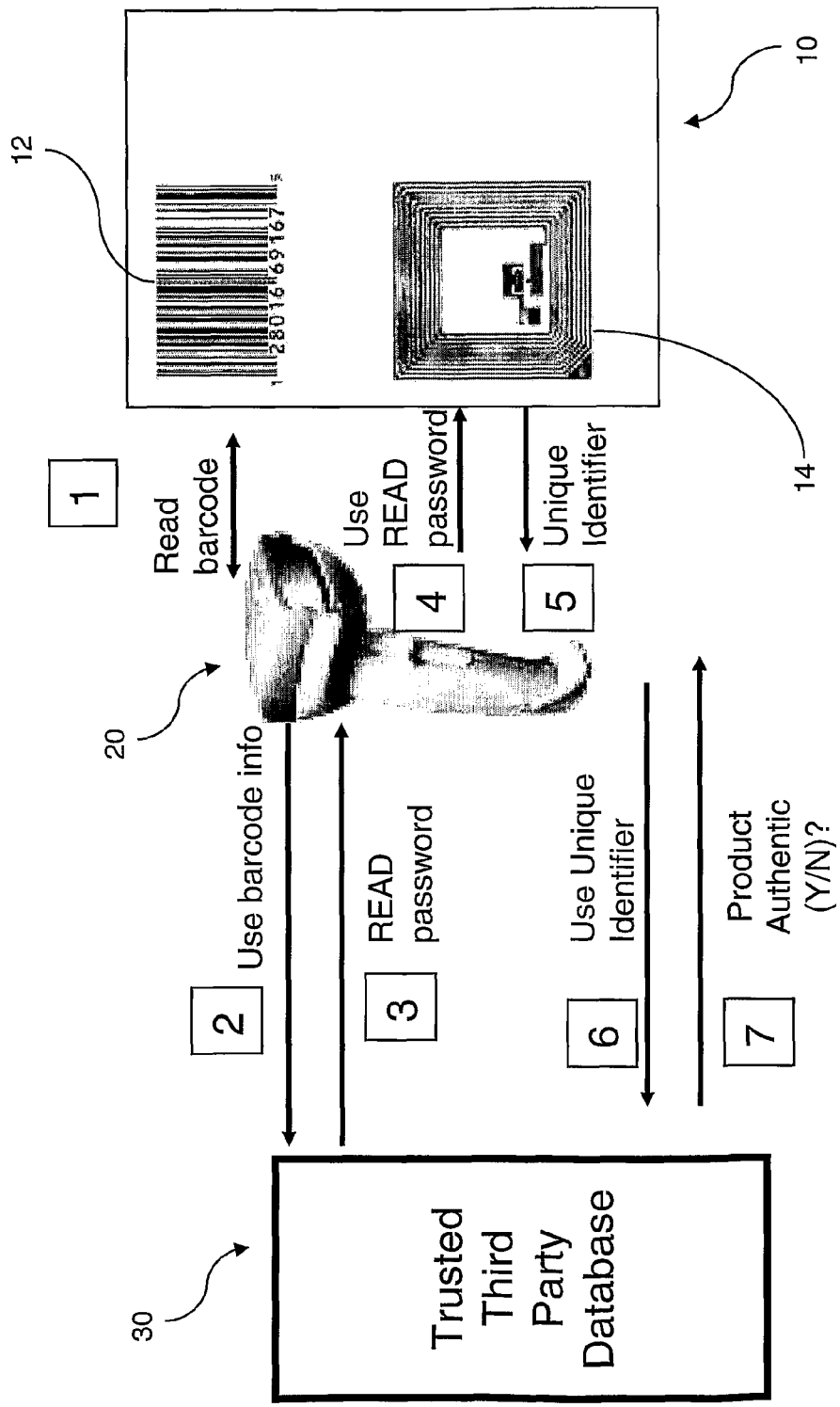
FIG. 2 is a representation of the components involved in an "authentication" operation performed according to a preferred embodiment of the invention.
Figure 3:
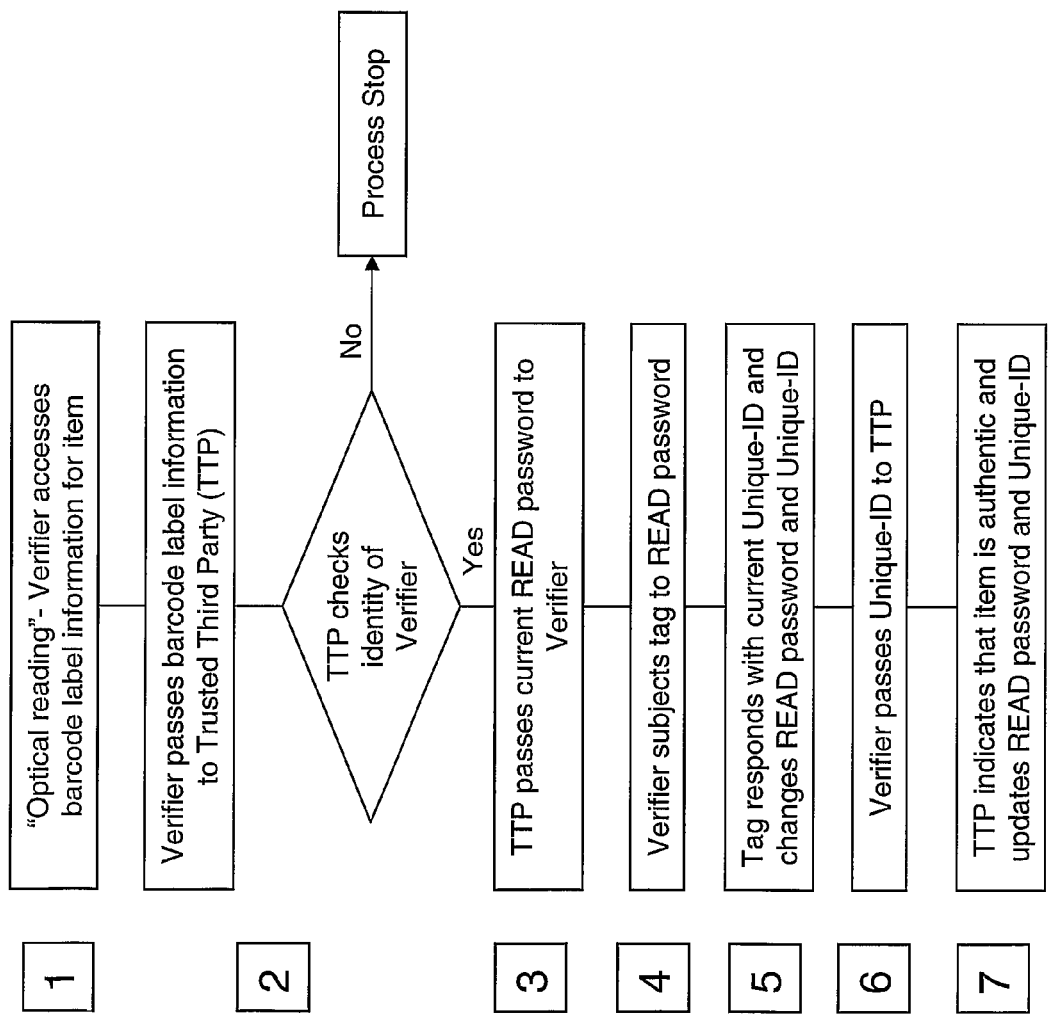
FIG. 3 is a flow-chart showing the steps involved in an "authentication" operation performed according to a preferred embodiment of the invention.

Referring now to FIG. 2, this shows a combined label associated with an item 10, the label having a barcode 12 (serving as an optical item identification component) and an RFID tag 14; a verifier 20, which in this figure is shown as a combined information transfer device having functionality as a barcode reader and an RFID reader; and a trusted third-party database 30. A complete "authentication" operation involves the following steps, which are indicated in boxes on FIG. 2, and which correspond to those shown in the flow-chart of FIG. 3:

Step 1: "Optical reading": The party wanting to verify the authenticity of the item, who will be referred to here as the "user", uses the barcode reader functionality of the verifier 20 to read the optical label 12 in order to establish the identity of the item from the barcode associated the item. (It will be noted that while the identity information from the barcode component 12 of the label should uniquely identify the item 10, it may be a copy, and may not provide any level of assurance that the item is authentic. The level of assurance provided by the barcode in this instance may be thought of as equivalent to the level of assurance provided by a simple RFID tag used to check a product on a pedigree database in prior systems such as those outlined above.)

Step 2: "Online Access": Once the user has made contact with the database 30, using any appropriate passwords or other security checks, the item identity information is sent to the database 30, having been transferred electronically from the barcode reader part of the verifier 20, entered manually by a user, or otherwise.

Step 3: "Provision of Read Password": Provided that the item identity information corresponds to an item represented in the database, and that there is no reason to block the user's attempt to obtain a READ password for the item in question, the user receives the currently-applicable READ password for the RFID tag 14. This may be stored electronically in the verifier 20, or received in other ways. In this way it can be ensured that the READ password will be provided only to a verifier that has the right to fully read the label, thus limiting the amounts of unwanted attempts to access the relevant product information via the RFID tag 14.

Steps 4 and 5: "Accessing the RFID tag": The user uses the READ password to trigger the RFID tag 14 to reveal a unique identifier that is only valid for that specific reading operation.

Steps 6 and 7: "Verifying the item": The unique identifier revealed by the RFID tag 14 can then be passed to the database 30, which can provide verification to the user that it is currently the correct identifier for the RFID tag 14.

It will be noted that authentication of the verifier and secure communication between the verifier and the trusted third party may take advantage of existing Internet security technologies.

Following a successful "authentication" operation, or more specifically once the RFID tag 14 has been subjected to the currently applicable READ password (step 4) and the current unique identifier has thus been revealed (step 5), the internal logic of the RFID tag replaces now-used READ password and unique identifier with a new READ password and unique identifier. If subjected again to the previous READ password, by a malicious user who has obtained it by eavesdropping, for example, the RFID tag 14 will not respond.

A possible scheme for generating a unique ID from the RFID tag will now be described, by virtue of which a cryptographic scheme may be implemented within the tag such that the tag is able to generate a different unique ID each time it is accessed. This cryptographic scheme is an encoding scheme in which a different cipher text is generated each time the correct READ password is provided to the tag, arranged in such a way that it is difficult or impossible for a malicious party to generate the correct cipher text without knowing a secret contained in the tag. Even if a malicious party is able to observe the output of the tag over a long period of time, the first, second and subsequent outputs will be totally different and unlinkable, thus a malicious party will still be prevented from deducing READ passwords and/or their respective outputs subsequent to those in the sequence that has been observed.

In order to address requirements for an anti-counterfeiting application, the following hash-chain scheme, similar to one proposed by Ohkubo, Suzuki and Kinoshita has been developed. (See Miyako Ohkubo, Koutarou Suzuki & Shingo Kinoshita: "Efficient Hash-Chain Based RFID Privacy Protection Scheme", International Conference on Ubiquitous Computing, Workshop Privacy, September 2004).

Figure 4:
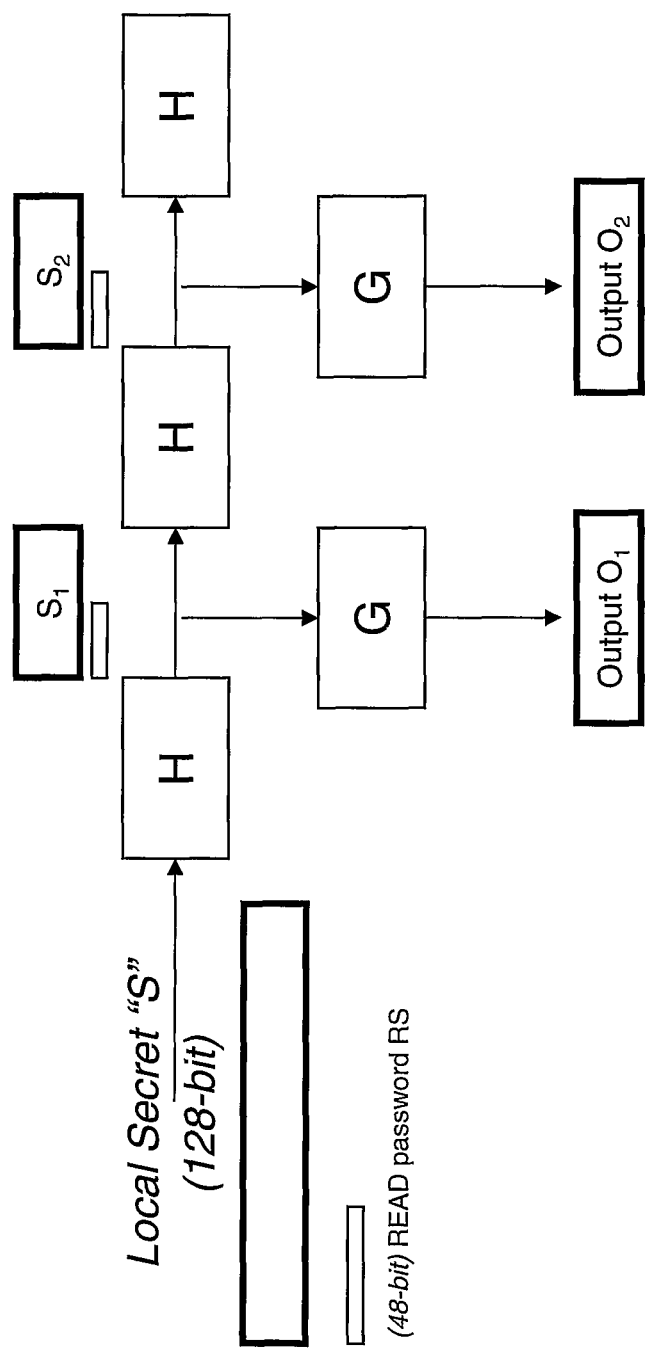
FIG. 4 shows a scheme for generating a sequence of unique IDs for an RFID tag.

Referring now to FIG. 4, the tag initially contains a local secret "S" (a 128-bit number, for example), part of which is used as the READ password "RS" (the first 48 bits, for example). When a reader queries the tag with the correct READ password, the local secret "S" is updated. The local secret "S" is provided as an input to a hash function H and the memory register in the tag containing "S" is updated to the resulting output "$S_1$". The READ password is hence updated to "$RS_1$" (i.e. the first 48 bits of "$S_1$"). The output of the tag is generated by providing secret "$S_1$" as the input to a function G, which may also be a one-way or hash function. The output value "$O_1$" is transmitted to the reader and it is this value that can be used to verify the authenticity of the product. In a subsequent operation, provision of the correct READ password "$RS_1$" would result in the local secret being updated to "$S_2$", and the output value "$O_2$" being transmitted to the reader.

Based on the properties of the one-way or hash functions H and G, the values of the outputs "O", the local secrets "S" and the reading passwords "RS" are different and unlinkable to one another. Since the function is one-way it is not possible (i.e. it is computationally unfeasible) to retrieve the input and the reading password information from the output. The only attack that is realistically possible is tampering with the information of the tag. In this case, an attacker may manage to access the secret within the tag. However, the above scheme provides a property of forward security thanks to the hash chain characteristics (in particular, the one-way property) or similar characteristics of other one-way functions. The information that the tag has emitted at previous steps can still not be replicated. This feature thus provides security of pedigree information.

Once the unique output value "O" has been received by the reader, the reader can pass the secret to the trusted third party for verification in order to determine if the product is original or not. The status of the product may then be returned to the user via the verifier 20 or otherwise. It is important to notice that the trusted third party generally remains synchronized with the tag. As a result, the trusted third party may be the only entity in the system that has a complete view of the READ password and the output of the tag. It can resolve a request from a reader with a complexity o(1), but we can say that the retrieval processing time is negligible.

It is stated above that the trusted third party "generally" remains synchronized with the tag. It will be noticed that a possible lack of synchronization can be caused if, for example, a user (honestly or maliciously) carries out a successful READ operation of the tag, thus causing the tag to update the READ password, but does not then complete the authentication procedure by passing the output or unique identifier to the trusted third party. It will be understood, however, that the system could be set up in such a way as to ensure that this would only allow a lack of synchronization of one READ password in the sequence, since subsequent attempts to carry out a complete authentication procedure will fail. The tag will be set to operate only when subjected to a READ password one ahead (in the sequence) of that which will be provided by the trusted third party, so the READ attempt will fail, and the tag will not update itself further. The system may thus be set up in such a way as to allow re-synchronization or re-setting, via the third party or the tag, without any substantial decrease in the level of security of the system.

The approach of using an online trusted third party may be regarded in some ways as a disadvantage because it requires users to perform an online "look-up" operation, which may need to be performed each time a product needs to be verified.

This also provides possible advantages, however. In the case of some pharmaceuticals and other perishable items, for example, items from a genuine source may become ineffective or even dangerous if they are too old, and should therefore be treated as "invalid" once a predetermined "sell by" date has passed. By forcing a user to refer to an online database when establishing the authenticity of the item, it is possible for an indication to be provided to the user that the "sell by" date has passed, thus thwarting an attempt by a malicious party to pass off out-of-date, and thus invalid items as valid, by dishonestly altering "sell-by" dates printed thereon.

For the above and other reasons, it is believed that embodiments of the present invention using an online trusted third party allow for a good trade-off in terms security and simplicity, in particular when a centralised product pedigree is required.

If the scheme is implement with trusted readers (i.e. readers that are running with certified trusted software), it will be understood that a trusted third party may delegate access to certain items to specific verifier authorities. The verifier authorities can then select the appropriate read password to access a tag and verify a tag with an offline operation. A method to synchronize the trusted verifier and the trusted third party may still be required, however. This means that if the reader is trusted, a proxy for the authentication service can be operated on the reader for selected tags (i.e. releasing certain secrets to the reader so that it can determine a passcode and verify the tag response).

As an example we will consider again the situation with pharmaceutical products. As described above, the pharmaceutical industry and various governmental organisations are keen to adopt schemes enabling individual products such as bottles and pill boxes to be tracked using unique identifiers so that their point of origin can be verified. This will provide advantages in terms of safety to end-users and allow companies to defeat counterfeiters, and thus protect their markets against the influx of cheap and possibly dangerous copies of their products.

In order to implement a scheme to allow authentication according to an embodiment of the present invention, when a pharmaceutical product is produced and sent to the wholesaler, an appropriate label with an RFID tag may be applied to each packet or bottle. An outer box may also have an appropriate label with an RFID tag, allowing a wholesaler to check that the box is original and contains authorised products. Once the box has been verified and unpacked, each single product may be verified before being put on sale and distributed to retailers. After that, the individual products are distributed to pharmaceutical retailers before being sold to the final users.

At each step across the supply chain the products may be verified and the pedigree information may be updated. It will be noticed that at each step a verifier may obtain access to the pedigree information of the product and receive an assurance that the product is original.

The invention claimed is:

1. A method for obtaining from an item information source item information relating to an item, said item having associated therewith an item identification means providing item identification information and an RFID response means arranged to provide a predetermined RFID response on being subjected to a currently applicable RFID trigger signal; said method comprising:
 establishing from said item identification means item identification information;
 using said item identification information to determine from said item information source a currently applicable RFID trigger signal for said RFID response means;
 subjecting said RFID response means to said currently applicable RFID trigger signal;
 receiving a predetermined RFID response from said RFID response means; and
 using said predetermined RFID response to obtain item information from said item information source;
 wherein the RFID response means is arranged to generate a new currently applicable RFID trigger signal and a new predetermined RFID response associated therewith following the subjecting of said RFID response means to said currently applicable RFID trigger signal;
 wherein the RFID response means and the item information source are each arranged to generate the new currently applicable RFID trigger signal in step with one another by performing at least one of the following:
 selecting and using a next member from a predetermined sequence of currently applicable RFID trigger signals;
 applying a predetermined one-way function or hash-function to the currently applicable RFID trigger signal; and
 applying a pseudorandom function to the currently applicable RFID trigger signal; and
 wherein the RFID response means and the item information source are each arranged to generate the predetermined RFID response associated with the new currently applicable RFID trigger signal in step with one another by performing at least one of the following:
 selecting and using a next member from a predetermined sequence of predetermined RFID responses;
 applying a predetermined one-way function or hash-function to an existing predetermined RFID response; and
 applying a pseudorandom function to an existing predetermined RFID response.

2. A method according to claim 1, wherein said item information source comprises at least one online database.

3. A method according to claim 1, wherein said item information source comprises a limited-access item information source.

4. A method according to claim 1, wherein said item information source holds restricted-access RFID trigger signals.

5. A method according to claim 1, wherein said item information source holds restricted-access item information.

6. A method according to claim 1, wherein said item identification means and said RFID response means are provided on an item label, in conjunction with item packaging, or in conjunction with the item itself.

7. A method according to claim 1, wherein said item identification means provides visually observable item identification information.

8. A method according to claim 1, wherein said item identification means provides electronically readable item identification information.

9. A method according to claim 8, wherein said electronically readable item identification information is provided by means of said RFID response means or a second RFID response means.

10. A method according to claim 1, wherein said item identification means provides item identification information by means of a barcode, 2-D code, or matrix-code.

11. a method according to claim 1, wherein said RFID response means is a passive RFID tag.

12. A method according to claim 1, wherein said predetermined RFID response is provided by said RFID response means only in the event that said RFID response means is subjected to a currently applicable RFID trigger signal.

13. A device for enabling a user to obtain from an item information source item information relating to an item, said device comprising an item identification means for providing item identification information, and an RFID response means, wherein:
- said item identification means comprises means from which can be established item identification information in dependence on which a currently applicable RFID trigger signal for said RFID response means can be determined from said item information source; and
- said RFID response means comprises means arranged to provide a predetermined RFID response on being subjected to said currently applicable RFID trigger signal, in dependence on which predetermined response item information can be obtained from said item information source;
- said RFID response means further comprising means arranged to generate a new currently applicable RFID trigger signal and a new predetermined RFID response associated therewith following the subjecting of said RFID response means to said currently applicable RFID trigger signal;
- said RFID response means being arranged to generate the new currently applicable RFID trigger signal in step with said item information source by performing at least one of the following:
- selecting and using a next member from a predetermined sequence of currently applicable RFID trigger signals;
- applying a predetermined one-way function or hash-function to the currently applicable RFID trigger signal; and
- applying a pseudorandom function to the currently applicable RFID trigger signal; and
- wherein said RFID response means is arranged to generate the predetermined RFID response associated with the new currently applicable RFID trigger signal in step with said item information source by performing comprises means arranged to perform at least one of the following:
- selecting and using a next member from a predetermined sequence of predetermined RFID responses;
- applying a predetermined one-way function or hash-function to an existing predetermined RFID response; and
- applying a pseudorandom function to an existing predetermined RFID response.

14. A device according to claim 13, wherein said item information source comprises at least one online database.

15. A device according to claim 13, wherein said item information source comprises a limited-access item information source.

16. A device according to claim 13, wherein said item information source holds restricted-access RFID triggers signals.

17. A device according to claim 13, wherein said item information source holds restricted-access item information.

18. A device according to claim 13, wherein said item identification means and said RFID response means are provided on an item label, in conjunction with item packaging, or in conjunction with the item itself.

19. A device according to claim 13, wherein said item identification means provides visually observable item identification information.

20. A device according to claim 13, wherein said item identification means provides electronically readable item identification information.

21. A device according to claim 20, wherein said electronically readable item identification information is provided by means of said RFID response means or a 10 second RFID response means.

22. A device according to claim 13, wherein said item identification means comprises a barcode, 2-D code, or matrix-code.

23. A device according to claim 13, wherein said RFID response means is a passive RFID tag.

24. A device according to claim 13, wherein said RFID response means is arranged to provide said predetermined RFID response only in the event that said RFID response means is subjected to a currently applicable RFID trigger signal.

* * * * *